(12) United States Patent
Amemiya

(10) Patent No.: US 7,394,605 B2
(45) Date of Patent: Jul. 1, 2008

(54) BROADBAND TRANSMISSION PATH APPARATUS, SUSPENSION ASSEMBLY AND STORAGE MEDIUM APPARATUS

(75) Inventor: Yoshihiro Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 11/167,842

(22) Filed: Jun. 27, 2005

(65) Prior Publication Data

US 2006/0215292 A1    Sep. 28, 2006

(30) Foreign Application Priority Data

Mar. 24, 2005    (JP) .............................. 2005-085825

(51) Int. Cl.
*G11B 5/09*    (2006.01)
(52) U.S. Cl. .......................... 360/46; 360/67
(58) Field of Classification Search ............... None
See application file for complete search history.

(56) References Cited

U.S. PATENT DOCUMENTS 5,671,098 A * 9/1997 Mathews et al. .............. 360/67
6,166,872 A * 12/2000 Uno et al. ..................... 360/65
6,667,842 B2 * 12/2003 Comeau et al. ............... 360/67
2004/0165305 A1 * 8/2004 Nishiyama ................... 360/75

FOREIGN PATENT DOCUMENTS

| JP | 9-282624 | 10/1997 |
| JP | 2000-311322 | 11/2000 |
| JP | 2001-101640 | 4/2001 |
| JP | 2003-162804 | 6/2003 |

* cited by examiner

*Primary Examiner*—Andrea Wellington
*Assistant Examiner*—Varsha A Kapadia
(74) *Attorney, Agent, or Firm*—Greer, Burns & Crain, Ltd.

(57) ABSTRACT

A broadband transmission path apparatus connects a head IC and a head in a suspension. Either one of the head IC and the head is assumed as a transmission terminal and the other is assumed as a reception terminal to divide a required transmission frequency band into at least two, one of which is assumed as a low band transmission path for low frequency transmission band and the other of which is assumed as a high band transmission path for high frequency transmission band. The high band transmission path forms a resonant circuit by a resistor component, an inductance component and a capacitor component of the transmission path itself, and realizes the high frequency transmission band characteristic by a resonant frequency characteristic of the resonant circuit.

20 Claims, 13 Drawing Sheets

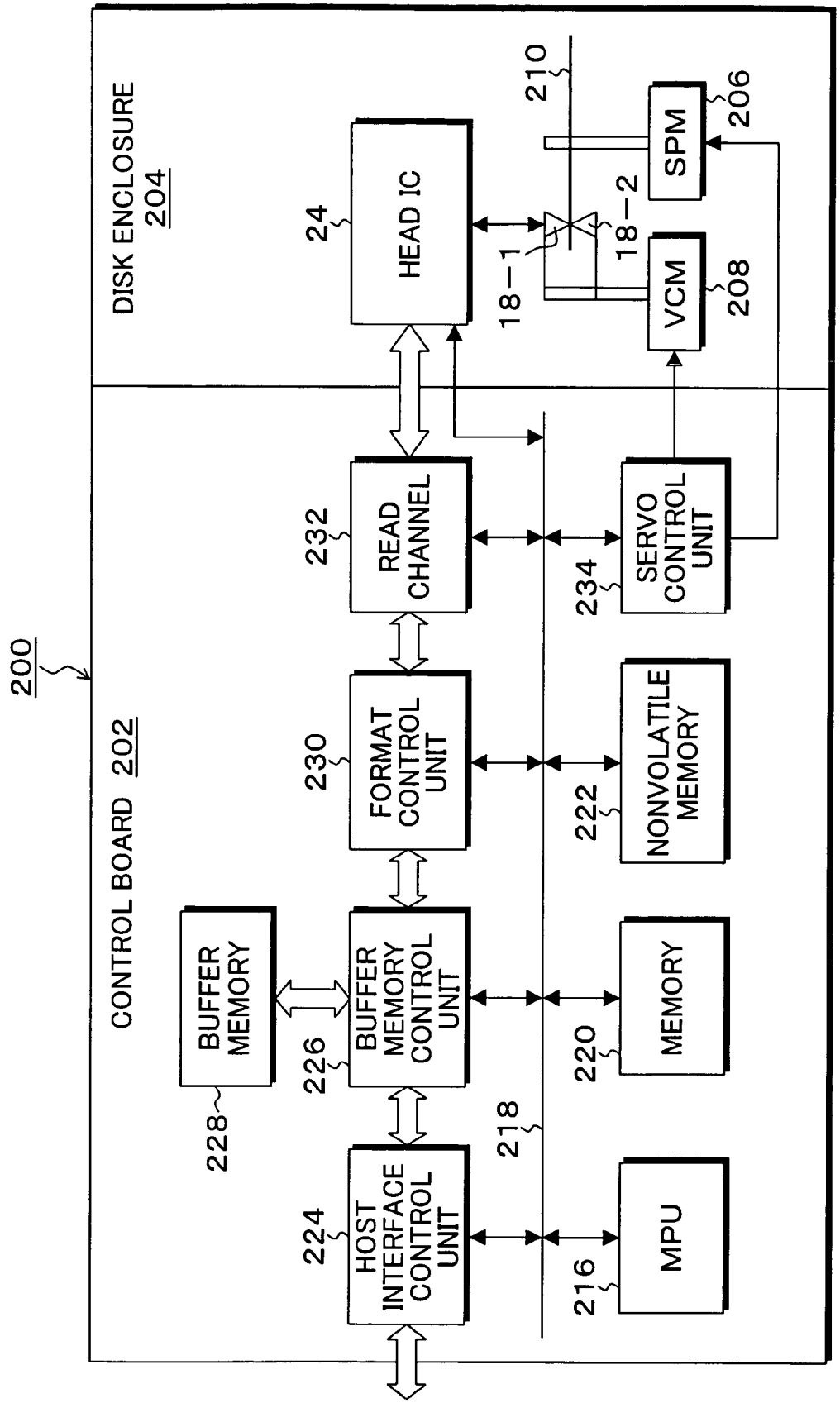

BROADBAND TRANSMISSION PATH APPARATUS, SUSPENSION ASSEMBLY AND STORAGE MEDIUM APPARATUS

This application is a priority based on prior application No. JP 2005-085825, filed Mar. 24, 2005, in Japan.

BACKGROUND OF THE INVENTION

1. Field of the Invention

The present invention relates to a broadband transmission path apparatus of a suspension for performing signal transmission between a head IC and a head in a magnetic disk apparatus, a suspension assembly and a storage medium apparatus, and particularly to a broadband transmission path apparatus of a suspension for enabling signal transmission in a broadband beyond gigahertz, a suspension assembly and a storage medium apparatus.

2. Description of the Related Arts

Conventionally, in a magnetic disk apparatus, a head is mounted on a tip of a suspension mounted on a head actuator, and the head and a head IC mounted on the base of the actuator are electrically connected by, for example, wiring formed on a flexible printed circuit board (FPC) In recent years, there is also used a wireless suspension where a circuit layer forming a transmission path on a metal foil such as stainless through an insulator is formed by a semiconductor manufacturing process. In such a conventional magnetic disk apparatus, data in a magnetic disk medium is read by a read head using a magnetoresistive element (MR element) or the like and is input into a read amplifier incorporated in the head IC through a transmission path, and thereafter the read data is demodulated in a read channel in a control board. The conventional transmission path of the suspension for connecting the head and the head IC employs a single transmission path constituting a parallel line relative to a ground, where a transmission band is expanded by a resonant frequency generated due to a frequency characteristic of the transmission path itself and the head IC, thereby enabling transmission from DC to several hundreds MHz. There are proposed a method for changing a structure or arrangement of the transmission path in order to reduce an influence due to skin effect on the transmission path for electrically connecting the head and the head IC (Patent References 1, 2), a method for surrounding the transmission path by a shield in order to reduce an influence due to noise (Patent Reference 3), and further a method for reducing a line loss by making a hole on a metal suspension constituting a grand arranged below the transmission path through an insulator (Patent References 4, 5).

[Patent Reference 1] Japanese Patent Application Laid-Open No. 2001-162804 Publication

[Patent Reference 2] Japanese Patent Application Laid-Open No. 2002-158411 Publication

[Patent Reference 3] Japanese Patent Application Laid-Open No. 2003-204130 Publication

[Patent Reference 4] Japanese Patent Application Laid-Open No. 2003-152404 Publication

[Patent Reference 5] Japanese Patent Application Laid-Open No. 2002-251706 Publication However, it is considered that the conventional transmission path of the suspension for connecting the head and the head IC is limited in a transmission of signals of about 1 GHz, and there is a problem that a signal no less than a transmission band of the transmission path is not transmitted at a signal transfer speed of a hard disk drive which is remarkably made faster. Further, in the method for changing the structural arrangement of the transmission path in order to reduce an influence due to skin effect in the transmission path, in the method for surrounding the transmission path by a shield in order to reduce an influence due to noise, and in the method for reducing a line loss by making a hole on a metal suspension constituting the grand arranged below the transmission path, which are conventionally proposed, there is a problem that it cannot be expected that the transmission path does not exceed the frequency band of the transmission path and that the transmission path does not function in a specific band. According to the present invention, there are provide a broadband transmission path apparatus of a suspension for enabling to transmit signals beyond about 1 GHz which is said to be a limit, a suspension assembly and a storage medium apparatus.

SUMMARY OF THE INVENTION

The present invention is characterized in that in a broadband transmission path apparatus for connecting a head circuit (head IC) and a head in a magnetic disk apparatus, either one of the head circuit and the head is assumed as a transmission terminal and the other is assumed as a reception terminal so that the transmission terminal and the reception terminal are connected through a plurality of transmission paths having different transmission frequency band characteristics.

The broadband transmission path apparatus according to the present invention provides a transmission path for low frequency transmission band and a transmission path for high frequency transmission band and connects each transmission path by the transmission terminal and the reception terminal.

The transmission path for high frequency transmission band forms a resonant circuit by a resistor component, an inductance component and a capacitor component of the transmission path itself, and realizes a high frequency transmission band characteristic by a resonant frequency characteristic of the resonant circuit.

The resonant circuit sets a resonant frequency within a transmission band by the inductance component and the capacitor component, and reduces a Q value by the resistor component to flatten a resonant peak characteristic. The head circuit is provided with a resonant adjusting circuit for setting and adjusting lack of the resistor component, the inductance component and the capacitor component of the transmission path itself. The resonant adjusting circuit is provided for each transmission path.

The present invention provides a suspension assembly for mounting a head. The suspension assembly according to the present invention is characterized in that the broadband transmission path apparatus for connecting the head circuit and the head is mounted, and either one of the head circuit and the head is assumed as a transmission terminal and the other is assumed as a reception terminal so that the broadband transmission path apparatus connects the transmission terminal and the reception terminal through a plurality of transmission paths having different transmission frequency band characteristics.

The suspension assembly according to the present invention is provided with a transmission path for low frequency transmission band and a transmission path for high frequency transmission band to connect each transmission path by the transmission terminal and the reception terminal. The transmission path for high frequency transmission band forms a resonant circuit by a resistor component, an inductance component and a capacitor component of the transmission path itself, and realizes a high frequency transmission band characteristic by a resonant frequency characteristic of the resonant circuit. The resonant circuit sets a resonant frequency within a transmission band by the inductance component and the capacitor component and reduces a Q value by the resistor component to flatten a resonant peak characteristic.

An output terminal of a read head provided in the head is assumed as a transmission terminal and an input terminal of a read amplifier provided in the head circuit is assumed as a reception terminal so that the suspension assembly according to the present invention connects the transmission terminal and the reception terminal through a plurality of transmission paths. An output terminal of a write driver provided in the head circuit is assumed as a transmission terminal and an input terminal of a write head provided in the head is assumed as a reception terminal so that the transmission terminal and the reception terminal are connected through a plurality of transmission paths. The transmission path is constituted of an insulator provided on a flexible metal foil constituting a ground and a circuit layer provided on the insulator.

The present invention provides a storage medium apparatus. The storage medium apparatus according to the present invention comprises a head for reading/writing information from/into a storage medium, a head circuit arranged between the head and a signal processing circuit, and a broadband transmission path apparatus for connecting the head circuit and the head, and either one of the head circuit and the head is assumed as a transmission terminal and the other is assumed as a reception terminal so that the broadband transmission path apparatus connects the transmission terminal and the reception terminal through a plurality of transmission paths having different transmission frequency band characteristics.

The storage medium apparatus according to the present invention is provided with a transmission path for low frequency transmission band and a transmission path for high frequency transmission band, and connects each transmission path by the transmission terminal and the reception terminal. The transmission path for high frequency transmission band forms a resonant circuit by the resistor component, the inductance component and the capacitor component of the transmission path itself, and realizes a high frequency transmission band characteristic by a resonant frequency characteristic of the resonant circuit. The resonant circuit sets a resonant frequency within a transmission band by the inductance component and the capacitor component and reduces a Q value by the resistor component to flatten a resonant peak characteristic.

An output terminal of a read head provided in the head is assumed as a transmission terminal and an input terminal of a read amplifier provided in the head circuit is assumed as a reception terminal so that the storage medium apparatus according to the present invention connects the transmission terminal and the reception terminal through a plurality of transmission paths. An output terminal of a write driver provided in the head circuit is assumed as a transmission terminal and an input terminal of a write head provided in the head is assumed as a reception terminal so that the transmission terminal and the reception terminal are connected through a plurality of transmission paths.

Another aspect of the storage medium apparatus according to the present invention is characterized by comprising a head for reading/writing information from/into a storage medium, a head circuit for amplifying a signal from the head and a transmission path apparatus for connecting the head circuit and the head and having a transmission frequency band characteristic no less than 1 GHz between a transmission terminal and a reception terminal when either one of the head circuit and the head is assumed as the transmission terminal and the other is assumed as the reception terminal.

According to the present invention, the head IC and one transmission terminal of the head are connected through a plurality of transmission paths, different frequency bands are allocated to a plurality of transmission paths to correspond to a plurality of transmission frequency bands, a signal to be transmitted at the transmission terminal is selectively transmitted through a transmission path corresponding to a frequency component of the signal by a frequency characteristic of the transmission path (frequency of the signal transmittable in the transmission path has been determined), and a plurality of transmission paths are connected at the reception terminal so that the signals transmitted through the respective transmission paths are finally combined and recovered. Therefore, though the signal transmission from DC to about 1 GHz was limited in the conventional single transmission path, according to the present invention, it is expected to easily realize the signal transmission from DC to several GHz. Further, the present invention infinitely increases the transmission paths in a specific band in theory, thereby enabling any signal transmission. The above and other objects, features, and advantages of the present invention will become more apparent from the following detailed description with reference to the drawings.

BRIEF DESCRIPTION OF THE DRAWINGS

FIG. 2 is a block diagram of the magnetic disk apparatus to which the present invention is applied;

DETAILED DESCRIPTION OF THE PREFERRED EMBODIMENTS

A magnetic disk apparatus using a magnetic disk will be explained as one example of the storage medium apparatus. A storage medium such as an optical disk apparatus can be applied to the storage medium apparatus for accessing information by a head in addition to the magnetic disk.

Figure 1A:
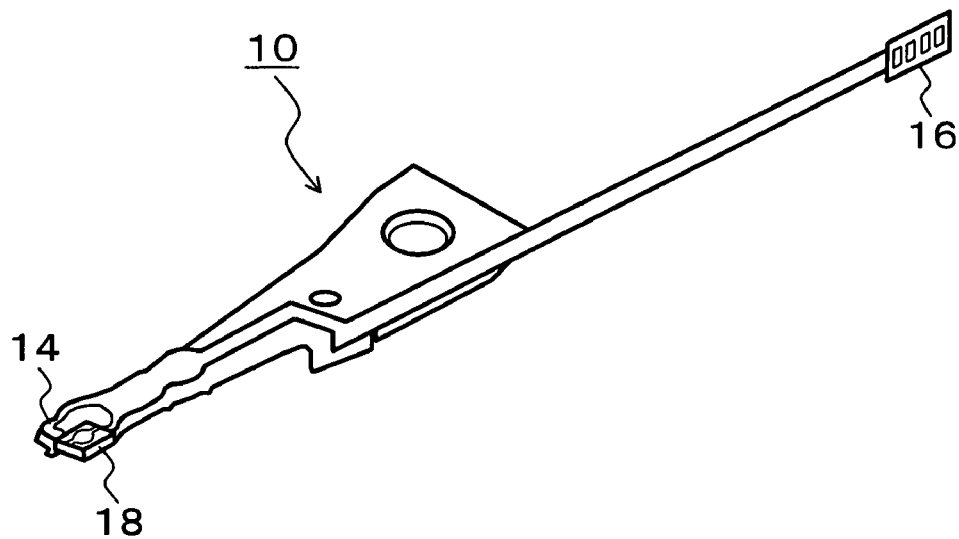
FIGS. 1A and 1B are explanatory diagrams of a long tail suspension of a magnetic disk apparatus to which the present invention is applied.
Figure 1B:
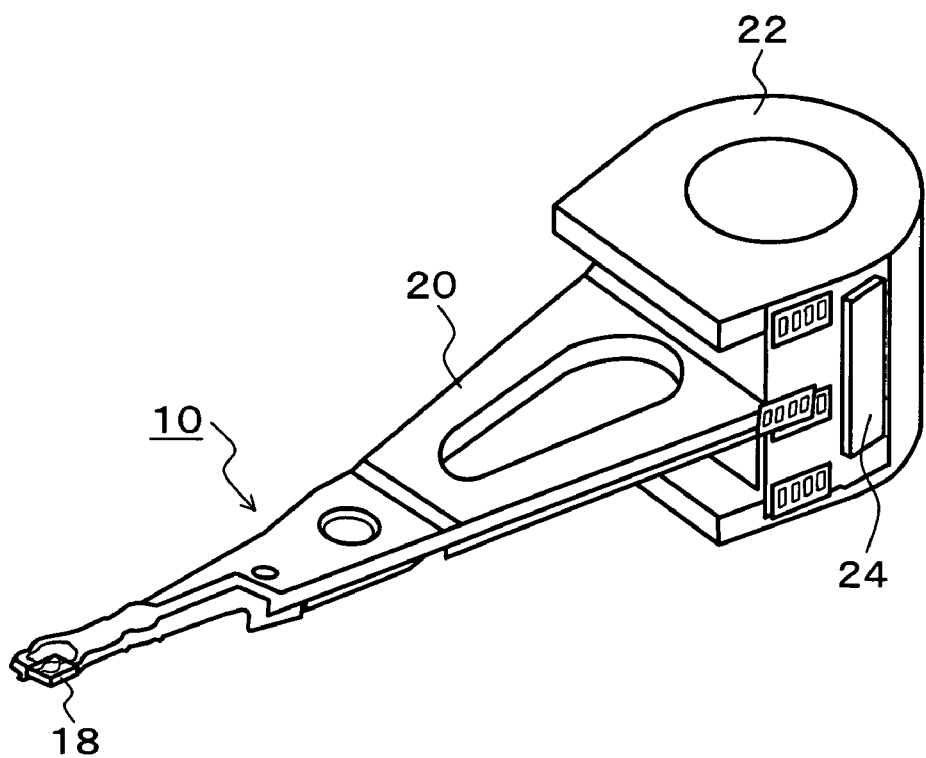

FIGS. 1A and 1B are explanatory diagrams of a long tail suspension of the magnetic disk apparatus to which a broadband transmission path apparatus according to the present invention is applied. FIG. 1A shows a long tail suspension 10 which is a flexible transmission path apparatus having a signal circuit formed on a metal foil via an insulator, which has a head connecting unit 14 to whose tip a head 18 is mounted and comprises an IC connecting unit 16 at a rear side thereof.

FIG. 1B shows an attachment state of the long tail suspension 10 relative to a head actuator, which is mounted on a tip of an arm 20 supported for a head actuator shaft 22, whose tail is mounted on a side of the arm 20, and which is connected to a head IC 24 on a flexible printed circuit board (FPC) mounted on a aide of the head actuator shaft 22. Such a long tail suspension 10 functions for electrically connecting the head 18 and the head IC 24, and an electric resistor, a capacitor and a characteristic impedance of a conductor are defined. A transmission path on the long tail suspension 10 is manufactured so that a circuit layer is formed by Cu plating after an insulator is coated on, for example, a stainless foil as a metal foil and the stainless foil is edged after forming a protective layer on the circuit layer, and is formed as a thin film circuit by a semiconductor manufacturing process so that the electric characteristics are determined with a dielectric constant and film pressure of an insulator material and a base resistor and film pressure of a conductor as parameters. While the long tail suspension 10 is constituted so that a transmission path from the head 18 to the head IC 24 is arranged on the suspension, a short tail suspension is constituted so that a transmission path from the head to the head arm is arranged in the suspension and the head arm and the head circuit are connected through a flexible cable or wire. Thus, the short tail suspension may form part of the transmission path apparatus or a circuit may be provided at one end of the flexible cable or wire to constitute the transmission path apparatus according to the present invention. In particular, in the case of the long tail suspension according to the present embodiment, since the transmission path apparatus can be directly formed on the suspension by the semiconductor process or the like, even when the number of signal lines for the transmission path increases, it is not necessary to save an arrangement space unlike the flexible cable or wire, which is effective for the space.

FIG. 2 is a block diagram of the magnetic disk apparatus to which the present invention is applied. In FIG. 2, a magnetic disk apparatus 200 known as a hard disk drive (HDD) is constituted of a disk enclosure 202 and a control board 204. The disk enclosure 202 is provided with a spindle motor 206 so that a disk medium 210 is mounted on a rotation shaft of the spindle motor 206 and is rotated for a certain time, for example, at 4200 rpm. Further, the disk enclosure 202 is provided with a voice coil motor 208, and the voice coil motor 208 mounts heads 18-1 and 18-2 on the tip of the arm of the head actuator, and positions the head relative to a recording face of the disk medium 210. A write head and a read head are integrally mounted on the heads 18-1 and 18-2. The heads 18-1 and 18-2 are connected to the head IC 24 through a signal line, and the head IC 24 selects one head by a select signal based on a write command or read command from a host as a higher-level apparatus to perform writing or reading. Further, the head IC 24 is provided with a write driver for write system and a read amplifier for read system. The control board 204 is provided with a MPU 216, and is provided with a memory 220 for storing therein a control program and control data using a RAM and a nonvolatile memory 222 for storing therein a control program using a flash memory or the like relative to a bus 218 of the MPU 216. Further, the bus 218 of the MPU 216 is provided with a host interface control unit 224, a buffer memory control unit 226 for controlling a buffer memory 228, a format control unit 230 functioning as a hard disk controller, a read channel 232 functioning as a write modulating unit and a read demodulating unit, and a servo control unit 234 for controlling the voice coil motor 208 and the spindle motor 206. The magnetic disk apparatus 200 performs write processing and read processing based on commands from the host. Here, the operations in the magnetic disk apparatus will be explained as follows. When the host interface control unit 224 receives a write command and write data from the host, it decrypts the write command in the MPU 216 and stores the received write data in the buffer memory 228 as needed, and then converts it to a predetermined data format in the format control unit 230 and adds an ECC code by ECC processing and performs scrambling, RLL code converting and write compensating in the write modulating system in a read channel 42, and thereafter writes data in a disk medium 210-1 from, for example, the write head of the head 18-1 selected through the write driver of the head IC 24. At this time, a head positioning signal is given to the servo control unit 234 using DSP from the MPU 224 and the voice coil motor 208 seeks the head to a target track indicated by the command and then performs ontrack and track following control. On the other hand, when the host interface control unit 224 receives a read command from the host, it decrypts the read command in the MPU 216 and amplifies a read signal read out from the read head selected by a head select of the head IC 24 in the read amplifier, and then inputs the same into the read demodulating system of the read channel 232 to demodulate the read data by partial response maximum likelihood detection (PRML) or the like and performs the ECC processing in the formatter control unit 230 to detection-correct an error, and thereafter buffers it to the buffer memory 218 and transfers the read data from the host interface control unit 224 to the host.

Figure 3:
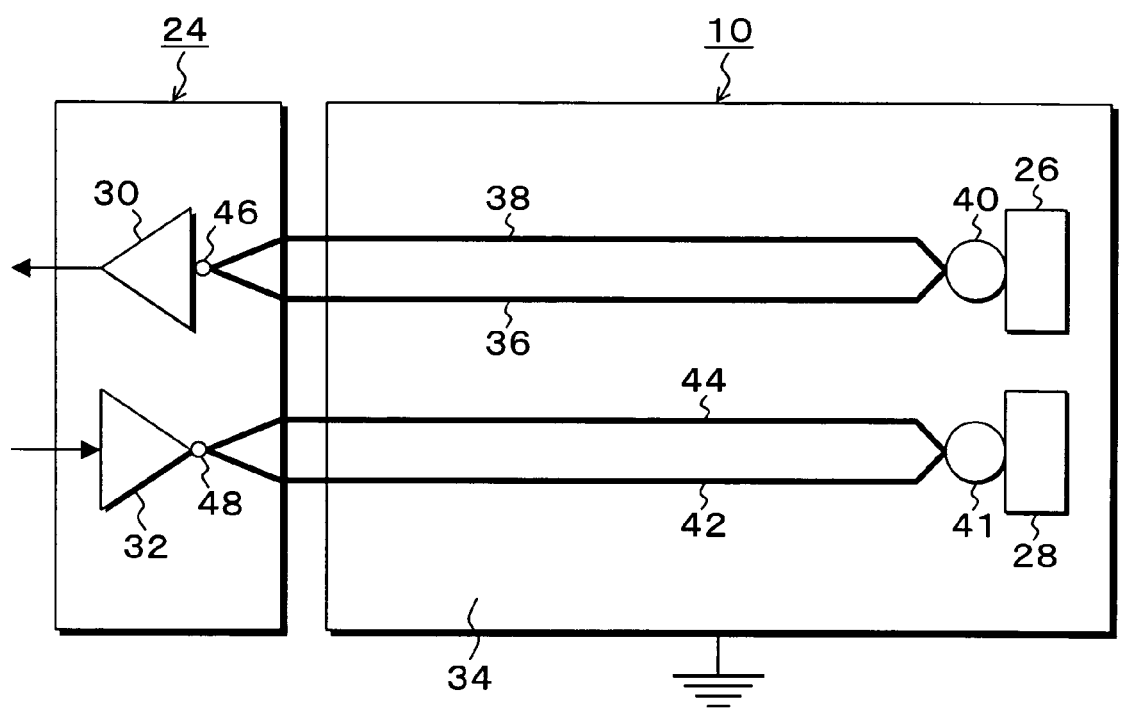
FIG. 3 is an explanatory diagram of an embodiment of a broadband transmission path apparatus according to the present invention having two transmission paths.

FIG. 3 is an explanatory diagram of an embodiment of a broadband transmission path apparatus according to the present invention having two transmission paths. In FIG. 3, the long tail suspension 10 electrically connects the head IC 24 and the head and a read head 26 and a write head 28 are provided at the head side. The read head 26 employs a giant magnetoresistance effect element (GMR element) or the like and the write head 28 employs an inductive head. The head IC 24 is provided with a read amplifier 30 as the read amplifier and a write driver 32. In the long tail suspension 10, the low band transmission path 36 and the high band transmission path 38 are formed relative to the ground metal foil 34 via the insulator (not shown) in correspondence to the read head 26 and the read amplifier 30. The low band transmission path 36 is a transmission path having a transmission band from DC to about several hundreds MHz, which is the same as a conventional single transmission path. The high band transmission path 38 comprises a transmission frequency band, for example, from several hundreds MHz to an upper limit frequency of no less than 1 GHz, and this high band transmission band adjusts the resonant frequency in the high band transmission path 38 to realize transmission in a specific band. The low band transmission path 36 and the high band transmission path 38 are connected to a pad 40 of the read head 26 with the read head 26 as the transmission terminal. Further, the low band transmission path 36 and the high band transmission path 38 are connected to a pad 46 with an input stage of the read amplifier 30 as the reception terminal. Thus, an analog read signal from the read head 26 is automatically frequency-divided into signals having a frequency band of the low band transmission path 36 and a different frequency band of the high band transmission path 38 in the pad 40 to be transmitted, and the signals of the frequency bands divided in the pad 46 are automatically combined to be input into the read amplifier 30. Thus, when the transmission path is viewed from the reception terminal of the pad 46 of the read amplifier 30, this transmission path acquires the broadband frequency characteristic where the two different frequency band characteristics of the low band transmission path 36 and the high band transmission path 38 are added and combined. Here, as one of the methods for generating the frequency band characteristic in the high band transmission path 38, a peak characteristic of:

$$fr=1/(2\pi\sqrt{LC})$$

is generated by assuming the resonant frequency fr in the band where one wants to transmit a signal by the inductance L and the capacitor C of the high band transmission path 38, and since the Q value (Quality factor) as an index of sharpness of this resonant peak characteristic is given by:

$$Q=2\pi fL/R,$$

the resistor component R of the high band transmission path 38 is adjusted to reduce the Q value, thereby flattening the peak. Though the resonant circuit for determining the transmission band frequency of the high band transmission path 38 can be formed by the inductance component, the capacitor component and the resistor component of the high band transmission path 38 itself, if the required resonant characteristic cannot be acquire only by the components of the high band transmission path 38, a resonant adjusting circuit is provided at the head IC 24 side, which will be apparent from the following explanation, to compensate for lack of the inductance, the capacitor and the resistor, thereby generating the required resonant characteristic.

Figure 4:
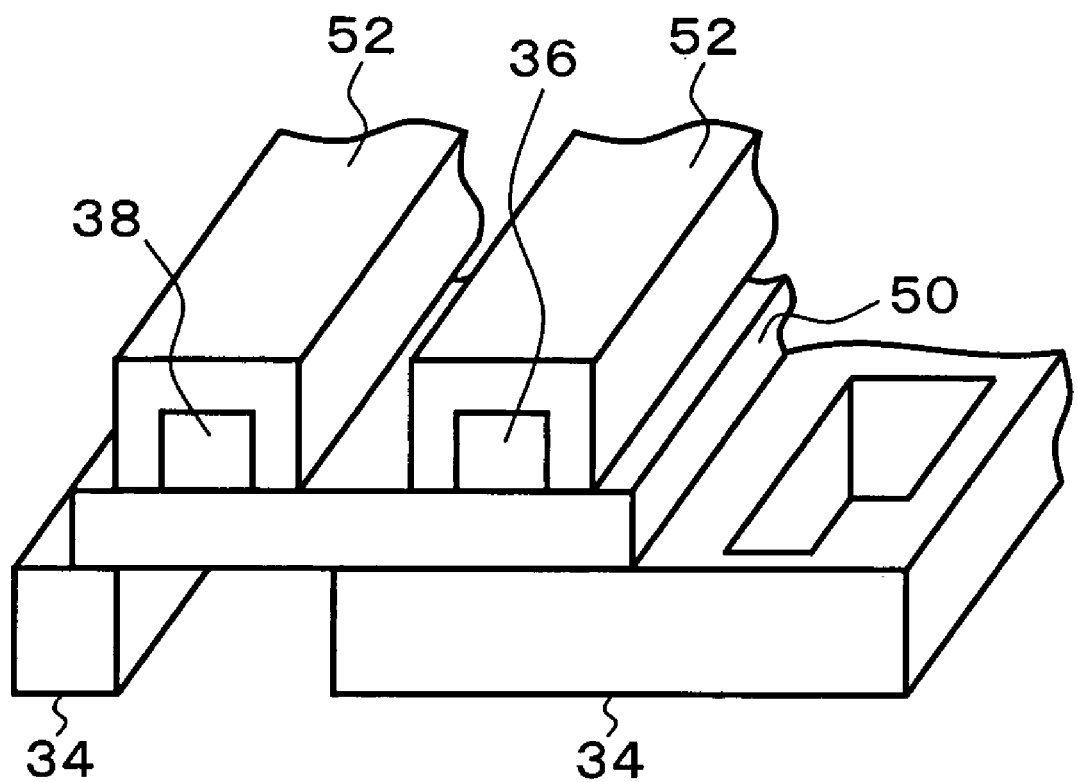
FIG. 4 is an explanatory diagram of a transmission path structure in the long tail suspension of FIG. 3.

FIG. 4 is an explanatory diagram of a transmission path structure in the long tail suspension 10 of FIG. 3. In FIG. 4, in the long tail suspension 10, an insulator 50 is formed on the ground metal foil 34 by using photosensitive polyimide, and then the low band transmission path 36 and the high band transmission path 38 as the circuit layers by Cu plating are formed by photosensitive resist, and further a protective layer 52 is formed similarly as the insulator 50. Finally, the stainless constituting the ground metal foil 34 is edged into a suspension shape to be completed. Referring to FIG. 3 again, since the long tail suspension 10 electrically connects the write driver 32 of the head IC 24 and the write head 28 of the head, the two transmission paths of the low band transmission path 42 and the high band transmission path 44 are provided so that one terminal is commonly connected to the pad 48 of the output of the write driver 32 as the transmission terminal and the other terminal is commonly connected to the pad 41 of the write head 28 as the transmission terminal. The low band transmission path 42 at the write head 28 side has the transmission frequency band characteristic, for example, from DC to several hundreds MHz similarly as the low band transmission path 36 at the read head 26 side. Further, the high band transmission path 44 determines the resonant frequency thereof to have the frequency band characteristics, for example, from several hundreds MHz to more than 1 GHz.

Figure 5A:
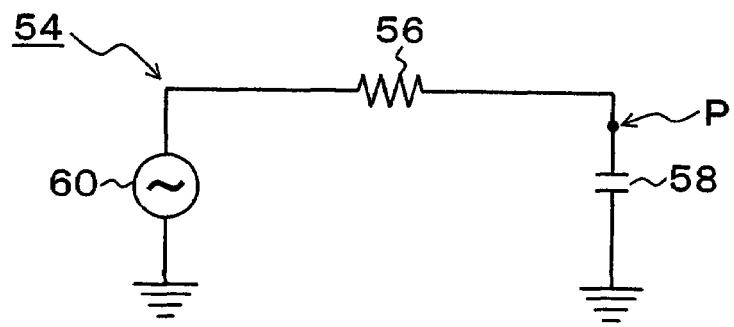
FIGS. 5A to 5C are explanatory diagrams of transmission path models corresponding to the broadband transmission path apparatus of FIGS. 1A and 1B.
Figure 5B:
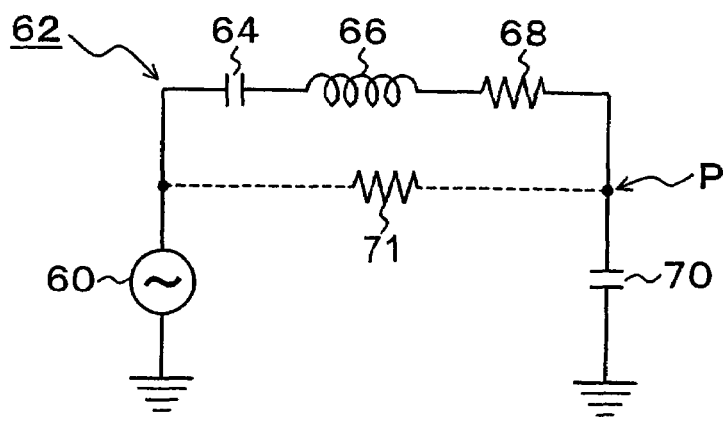
Figure 5C:
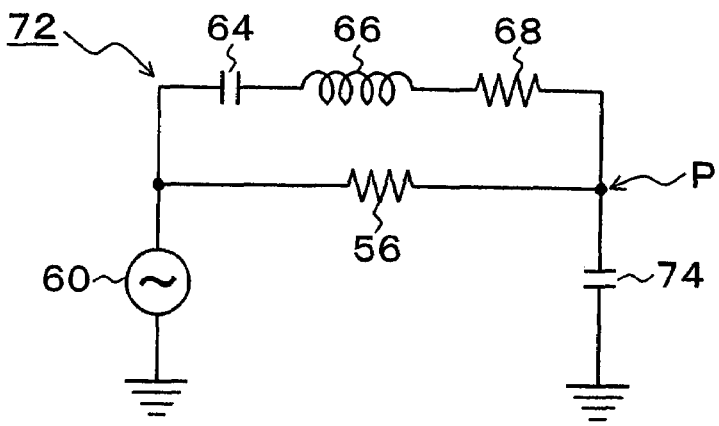

FIGS. 5A to 5C are explanatory diagrams of transmission path models corresponding to the broadband transmission path apparatus of FIG. 3. In the broadband transmission path apparatus according to the present invention, though the broadband transmission path is constituted of the two transmission paths of the low band transmission path 36 and the high band transmission path 38 as shown in, for example, the read head 26 in FIG. 3, it is confirmed by the frequency characteristics by simulation that the transmission paths having the different frequency characteristics are connected by the transmission terminal and the reception terminal, thereby enabling the broadband transmission.

FIG. 5A shows a low band transmission path model 54 where the transmission path is considered only by a resistor 56, which can be said as a simplified model of the transmission path. A signal source 60 is connected to the transmission terminal of this low band transmission path model 54 and a frequency is changed from DC to measure the frequency characteristic at point P as the transmission terminal. Here, a capacitor 58 of the transmission terminal P is a capacitor component generated between the transmission path and the ground metal foil 34 arranged behind via the insulator in the long tail suspension 12.

FIG. 5B shows a high band transmission path model 62 adjusted for transmission of high frequency signals, which is expressed by a model where a capacitor 64, an inductance 66 and a resistor 68 are serially connected. A capacitor 70 at the measurement point P as the transmission terminal is a capacitor component between the transmission path and the ground metal foil in the long tail suspension 10 similarly as in FIG. 5A. For the simulation using this high band transmission path model 62, since the simulation cannot be performed when the measurement point P is not conducted in changing the frequency and transmitting a signal from the signal source 60, a high resistor 71 is connected in parallel as indicated in dashed line, but this high resistor 71 is not a component of the transmission path.

FIG. 5C shows a parallel connecting circuit of the transmission path model indicated by the resistor 56 having the band of the low band transmission path 36, for example, at the read head 26 shown in FIGS. 1A and 1B and the transmission path model where the capacitor 64, the inductance 66 and the resistor 68 are serially connected in correspondence to the high band transmission path 38. A capacitor 74 at the measurement point P is a capacitor between the transmission path and the ground metal foil.

Figure 6:
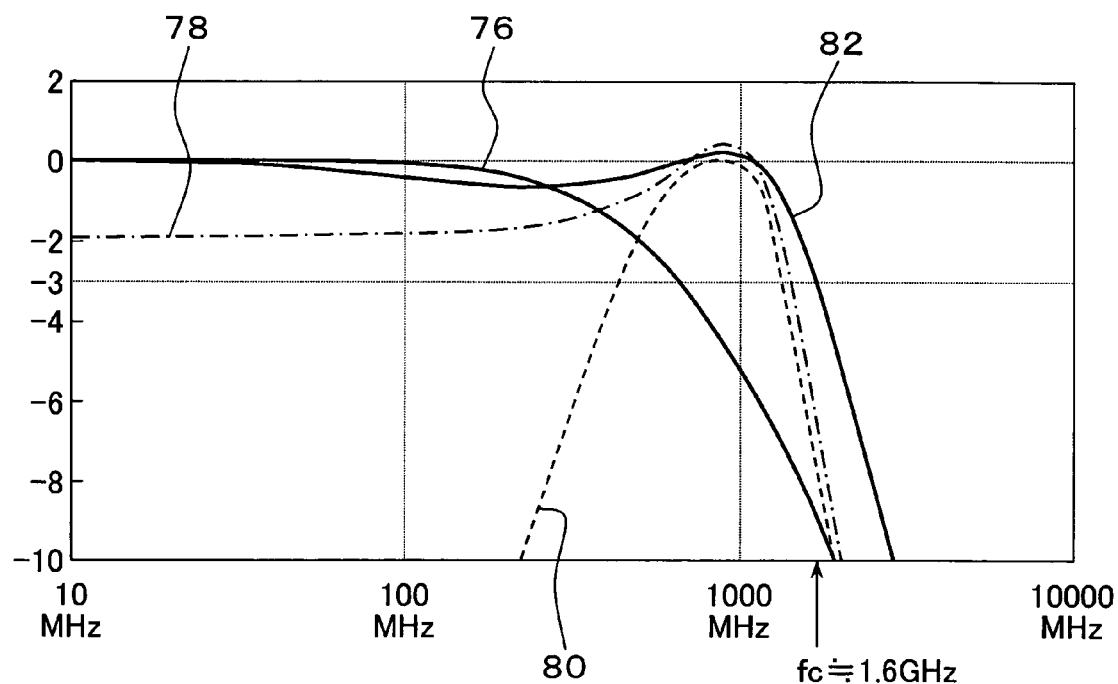
FIG. 6 is an explanatory diagram of frequency characteristics of the transmission path models of FIGS. 5A to 5C.

FIG. 6 shows measurement results of the frequency characteristics obtained by the simulation of the low band transmission path model 54, the high band transmission path model 62 and the broadband transmission path model 72 shown in FIGS. 5A, 5B and 5C. In the graph of these frequency characteristics, a gain by which transmission is guaranteed is up to −3 dB and this frequency of −3 dB is a cutoff frequency for determining a band width.

A low band transmission path characteristic 76 is obtained for the low band transmission path model 54 in FIG. 5A. The low band transmission path characteristic 76 has an upper limit cutoff frequency of about 650 MHz. A high band transmission path characteristic 78 is obtained for the high band transmission path model 62 in FIG. 5B. The high band transmission path characteristic 78 is realized by setting the resonant frequency fr by the capacitors 64, 70 and the inductance 66 in the high band transmission path model 62 at about fr=1 GHz and adding a broadband transmission path resonant characteristic 80 where the resistor component 68 is adjusted so that the Q value is reduced for flattening the peak characteristic. Since the high resistor 71 connected in parallel for the simulation in FIG. 5B is not present in the actual high band transmission path 38, only the high band transmission path resonant characteristic 80 may be considered.

A broadband transmission characteristic 82 is obtained for the broadband transmission path model 72 expressing the low band transmission path 36 and the high band transmission path 38 according to the present invention in FIG. 5C. The broadband transmission characteristic 82 is obtained as a combined frequency characteristic of the high band transmission path resonant characteristic 80 for producing the low band transmission path characteristic 76 and the high band transmission path characteristic 78. This broadband transmission characteristic 82 realizes the upper limit cutoff frequency fc of about 1.6 GHz. Thus, according to the broadband transmission path apparatus using the low band transmission path and the high band transmission path according to the present invention from the simulation results of the transmission path models in FIGS. 5A to 5C, the broadband frequency characteristic from DC to about 1.6 GHz can be realized, and the broadband transmission characteristic of, for example, 1.6 GHz beyond 1 GHz can be easily realized though about 1 GHz was conventionally a limit in the single transmission path.

Figure 7:
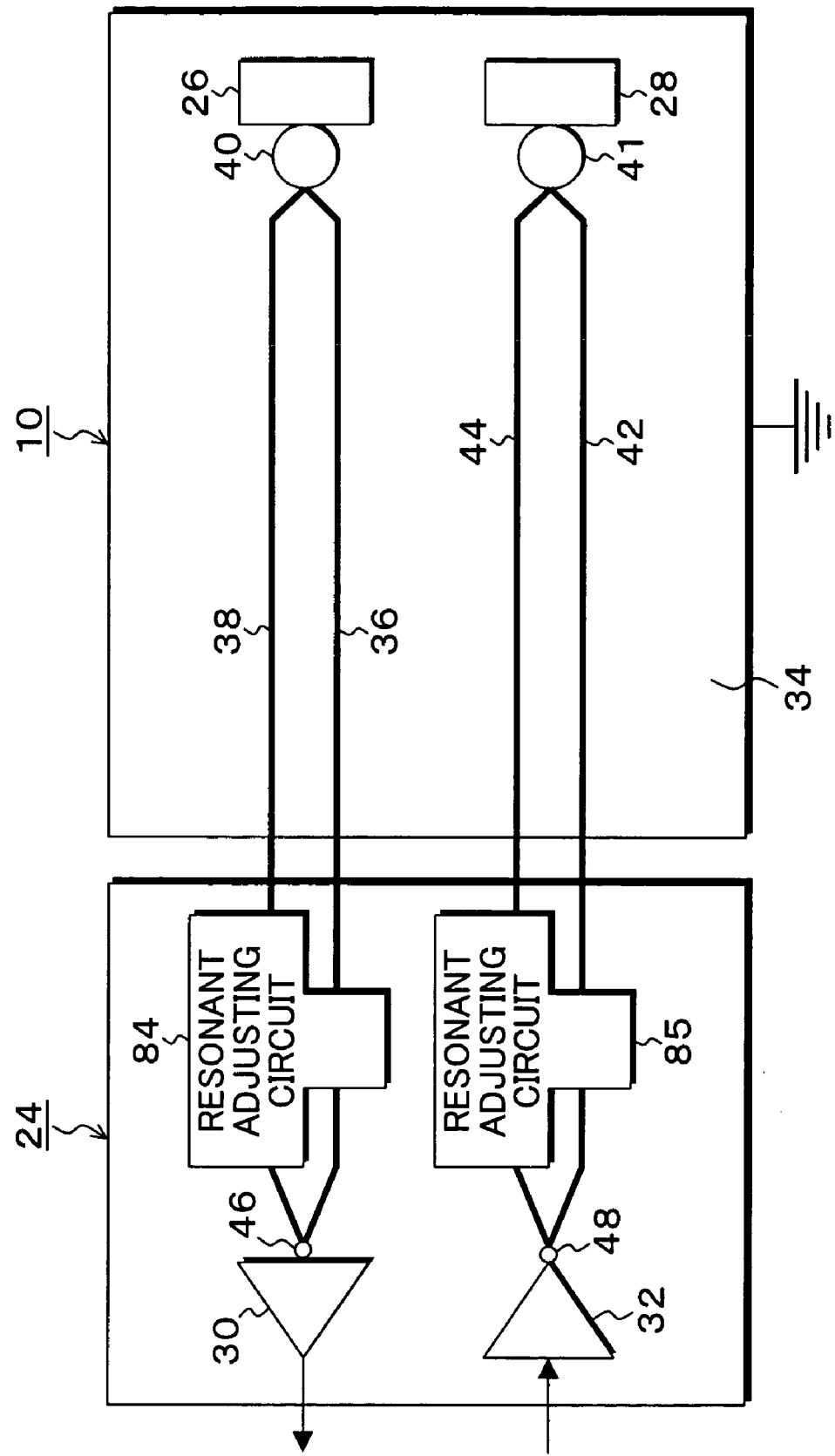
FIG. 7 is an explanatory diagram of a broadband transmission path apparatus according to the present invention having resonant adjusting circuits added to FIG. 3.

FIG. 7 is an explanatory diagram of a broadband transmission path apparatus according to the present invention where resonant adjusting circuits are added to the embodiment of FIG. 3. In FIG. 7, in this embodiment, the resonant adjusting circuits 84, 85 are provided at the head IC 24 side such that the capacitor component, the inductance component and the resistor component for the high band transmission path 38 and the low band transmission path 36 at the read head 26 can be adjusted and set at the optimum values as needed. Similarly, the capacitor component, the inductance component and the resistor component can be adjusted and set at required values in the resonant adjusting circuit 85 also for the low band transmission path 42 and the high band transmission path 44 at the write head 28.

Figure 8:
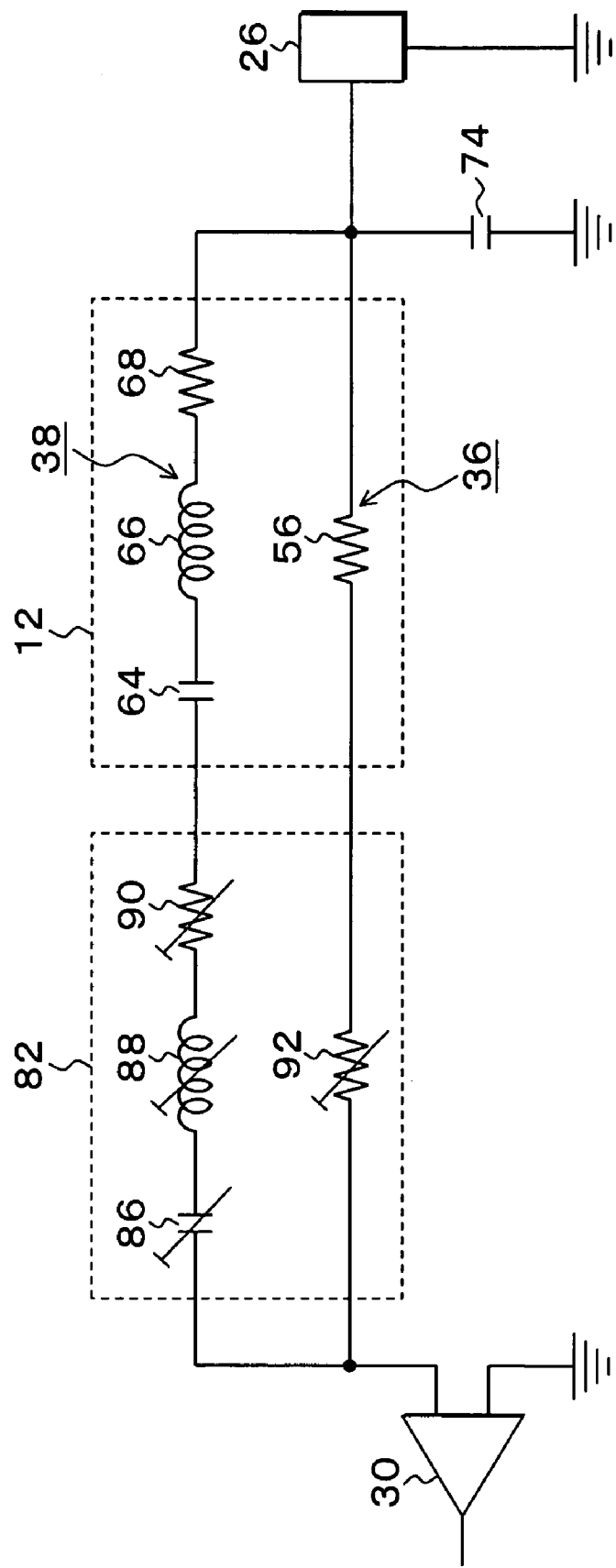
FIG. 8 is an explanatory diagram of a transmission path model corresponding to the broadband transmission path apparatus of FIG. 7.

FIG. 8 is an explanatory diagram of a transmission path model corresponding to the broadband transmission path apparatus comprising the resonant adjusting circuits of FIG. 7 and exemplifies the read head 26. In FIG. 8, the transmission path model serially connects the capacitor 64, the inductance 66 and the resistor 68 for the high band transmission path 38 at the long tail suspension 10, comprises a resistor 56 for the low band transmission path 36, and further has a capacitor 74 between the transmission path and the ground metal foil 34. On the other hand, the resonant adjusting circuit 84 is provided at the reception terminal comprising the read amplifier 30. The resonant adjusting circuit 84 provides an adjusting resistor component 92 in series with the resistor 56 in the low band transmission path 36, and adjusts a value of the adjusting resistor component 92 and then fixes it such that a required low band frequency characteristic can be obtained. The resonant adjusting circuit 84 is provided with an adjusting capacitor component 86, an adjusting inductance component 88 and an adjusting resistor component 90 for the high band transmission path 38, and the high band transmission path 38 at the long tail 12 adjusts to compensate for a lacking component at the resonant adjusting circuit 84 and fixes it to set. It is possible not only to adjust the respective different frequency bands by the component adjustment of the high band transmission path and the low band transmission path by such a resonant adjusting circuit 84 but also to generate the resonant frequency by the high band transmission path 38 itself. A method for generating the resonant frequency by this transmission path itself is to adjust the shape of the transmission path. That is, since the capacitor 64 corresponds to a connecting unit between the read head 26 and the transmission path in the high band transmission path 38, the shape of this unit is adjusted so that the value of the capacitor 64 can be adjusted.

Further, the inductance 66 can be adjusted by a width or thickness of the transmission path. Furthermore, the capacitor 74 connected in parallel can be adjusted by a thickness of the insulator and a material of the insulator which determine a gap between the transmission path and the ground metal foil in the long tail suspension. Naturally the resistor 56 at the low band transmission path 36 can be adjusted by a length of the transmission path.

Figure 9:
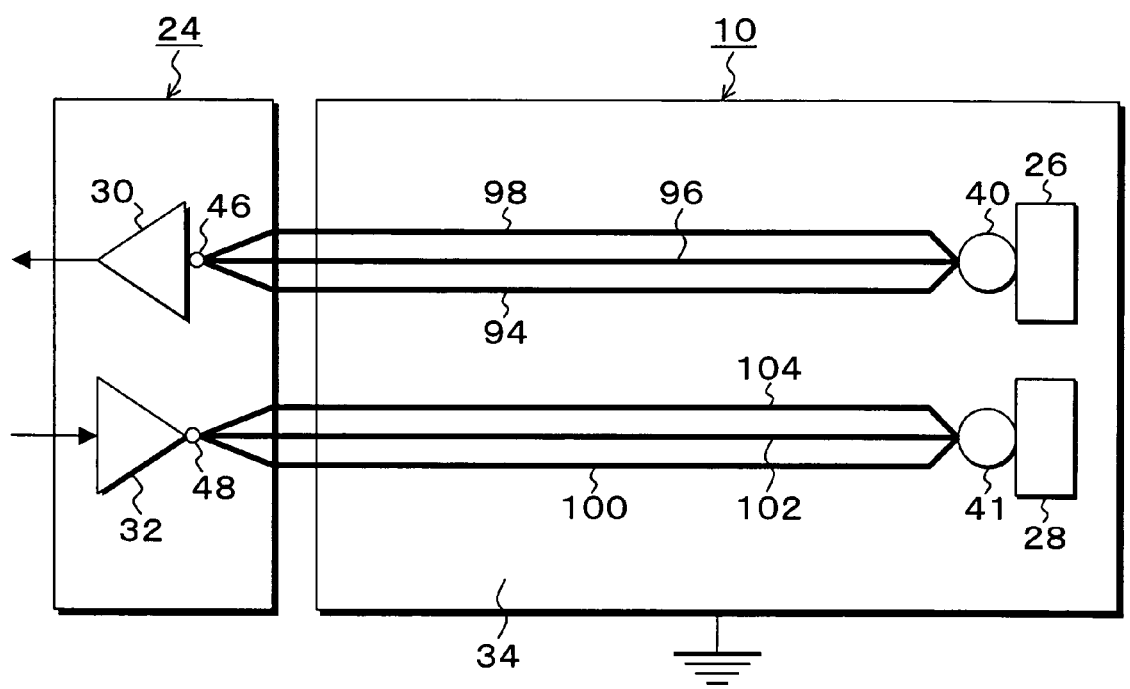
FIG. 9 is an explanatory diagram of an embodiment of a broadband transmission path apparatus according to the present invention having three transmission paths.

FIG. 9 is an explanatory diagram of an embodiment of a broadband transmission path apparatus according to the present invention having three transmission paths. In FIG. 9, the long tail suspension 10 is provided with the three transmission paths of a low band transmission path 94, a first high band transmission path 96 and a second high band transmission path 98 in correspondence to the read head 26 and the read amplifier 30 for electrically connecting the both, which are coupled at the pad 40 as the transmission terminal and at the pad 46 as the input stage of the read amplifier 30 as the reception terminal. Similarly, three transmission paths of a low band transmission path 100, a first high band transmission path 102 and a second high band transmission path 104 are provided also between the write driver 32 and the write head 28, and the three transmission paths are coupled at the pad 40 as the output terminal of the write driver 32 as the transmission terminal and at the pad 41 of the write head 28 as the reception terminal. With the read head 26 as an example, the low band transmission path 94 has a transmission frequency band, for example, from DC to several hundreds MHz, which is the same transmission characteristic as in the conventional single transmission path. The resonant frequency characteristic is determined such that the first high band transmission path 96 has a transmission frequency band from 150 MHz to 750 MHz, for example. Further, the resonant characteristic is determined such that the second high band transmission path 98 has a higher transmission frequency characteristic from 750 MHz to 3 GHz. This point is similar as in the low band transmission path 100, the first high band transmission path 102 and the second high band transmission path 104 at the write head 28 side.

Figure 10:
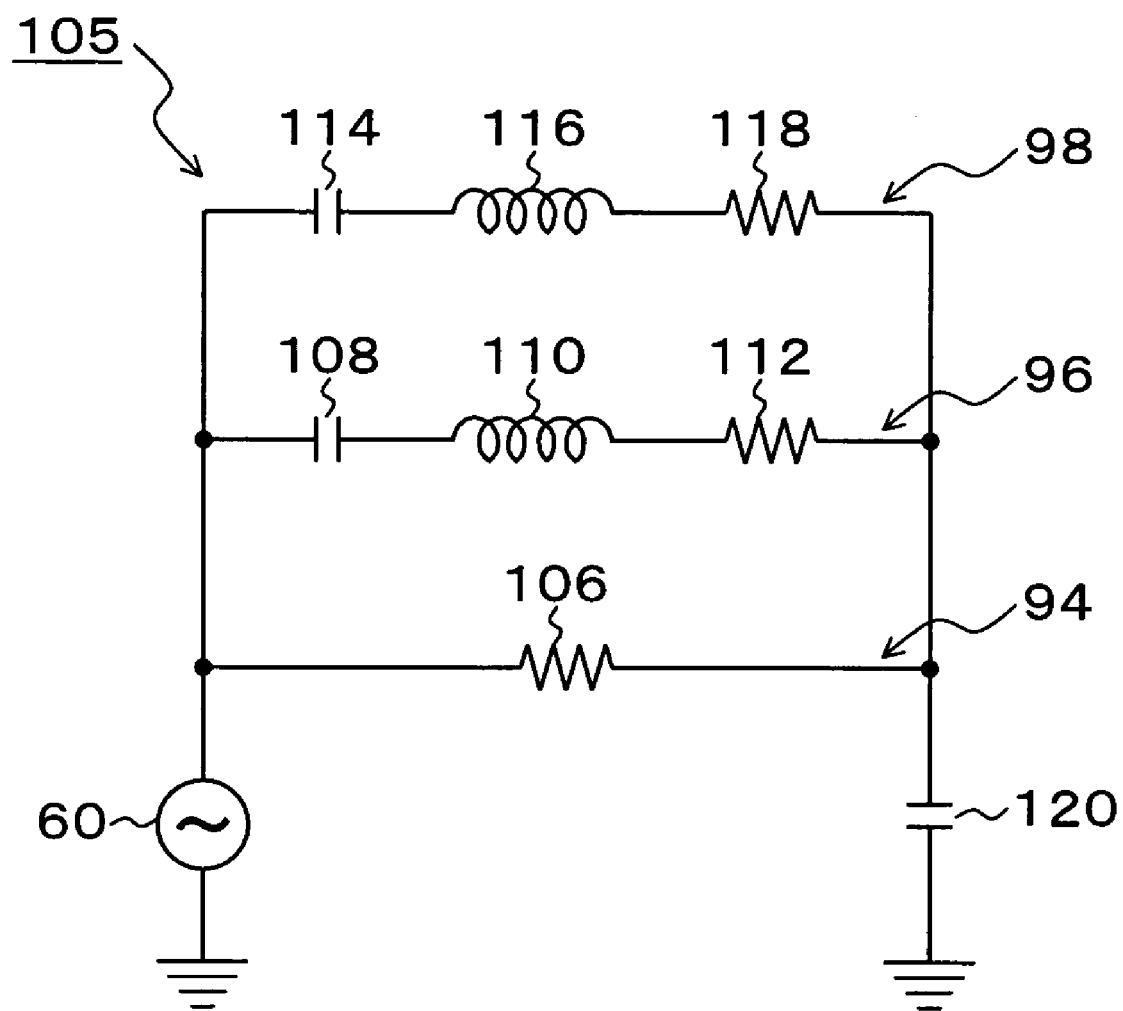
FIG. 10 is an explanatory diagram of a transmission path model corresponding to the broadband transmission path apparatus of FIG. 9.

FIG. 10 is an explanatory diagram of a transmission path model corresponding to the broadband transmission path apparatus of FIG. 9 and exemplifies the read head 26. In FIG. 10, a broadband transmission path model 105 has a resistor 106 for the low band transmission path 94, and a capacitor 108, an inductance 110 and a resistor 112 for the first high band transmission path 96, thereby setting a resonant frequency fr1. Further, it has a capacitor 114, an inductance 116 and a resistor 118 for the second high band transmission path 98, thereby determining a higher resonant frequency fr2 by these components.

Figure 11:
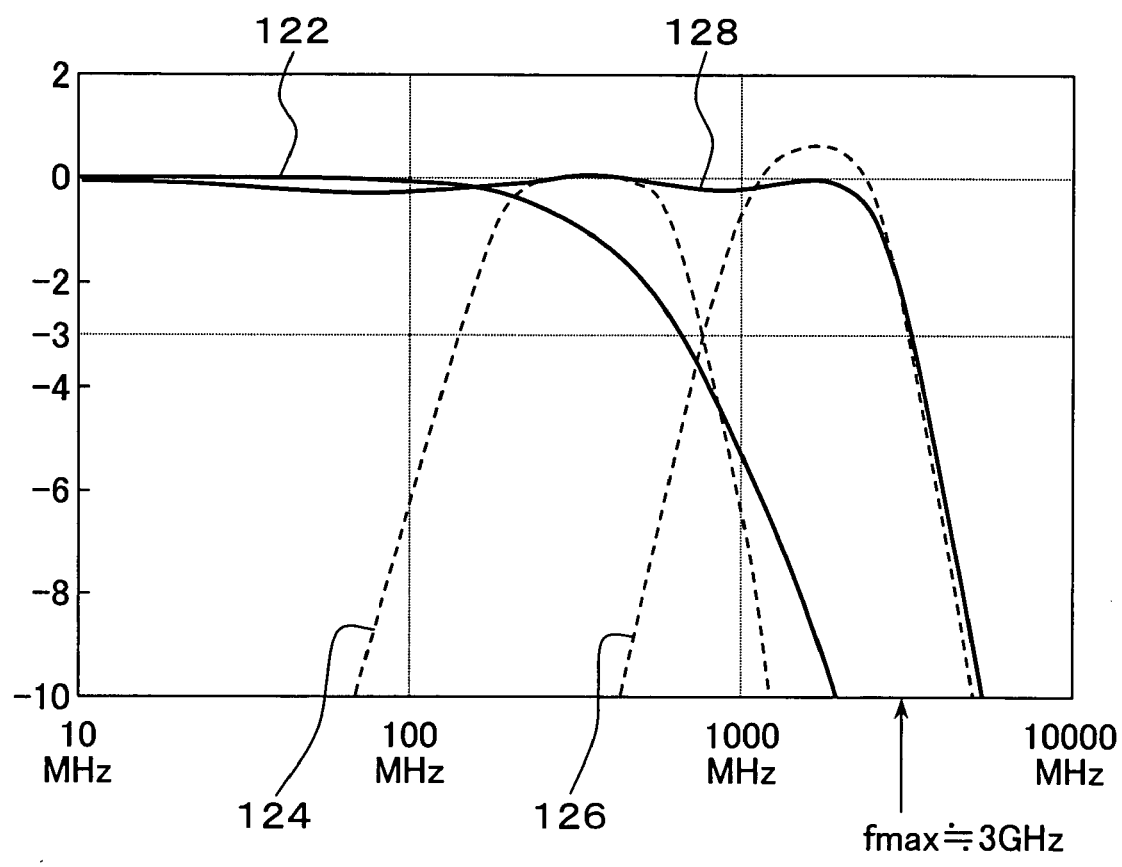
FIG. 11 is an explanatory diagram of frequency characteristics of the transmission path model of FIG. 10.

FIG. 11 is an explanatory diagram of frequency characteristics of the broadband transmission path model of FIG. 10. A low band transmission path characteristic 122 is obtained for the low band transmission path 94 in FIG. 10 and a cutoff frequency at a position lower by −3 dB is about 650 MHz. A first high band transmission path resonant characteristic 124 is obtained from the first high band transmission path 96 and an upper limit cutoff frequency thereof is about 750 MHz. Further, a second high band transmission path resonant characteristic 126 is obtained from the second high band transmission path 98 and an upper limit cutoff frequency thereof expands to about 3 GHz. As a result, it is apparent that a broadband transmission characteristic 128 as the broadband transmission model 105, which is obtained by connecting the low band transmission path 94, the first high band transmission path 96 and the second high band transmission path 98 at the transmission terminal and the reception terminal, is a frequency characteristic having the low band transmission path characteristic 122, the first high band transmission path resonant characteristic 124 and the second high band transmission path resonant characteristic 126 combined and that a cutoff frequency thereof expands to about 3 GHz. In this manner, in the broadband transmission path apparatus according to the present invention, since transmission paths having a specific frequency band characteristic can be infinitely increased in theory, it is possible to transmit a signal having a transmission band of any high frequency.

Figure 12:
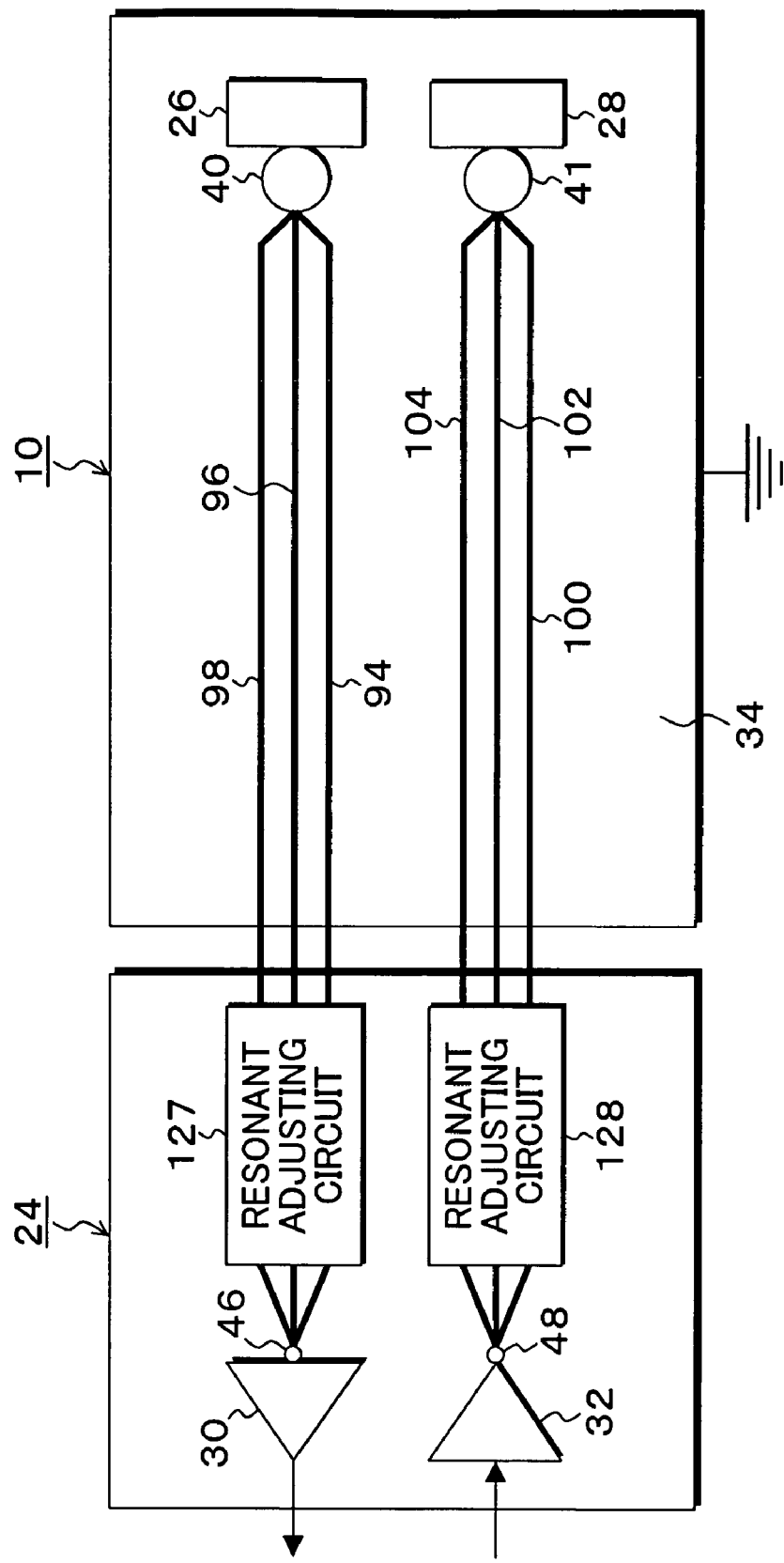
FIG. 12 is an explanatory diagram of a broadband transmission path apparatus according to the present invention having resonant adjusting circuits added to FIG. 9.

FIG. 12 is an explanatory diagram of a broadband transmission path apparatus according to the present invention having resonant adjusting circuits added to the embodiment of FIG. 9. FIG. 12 is identical to the embodiment of FIG. 9 in that the long tail suspension 10 is provided with three transmission paths, but in this embodiment, two resonant adjusting circuits 127 and 128 are further provided at the head IC 24 side.

Figure 13:
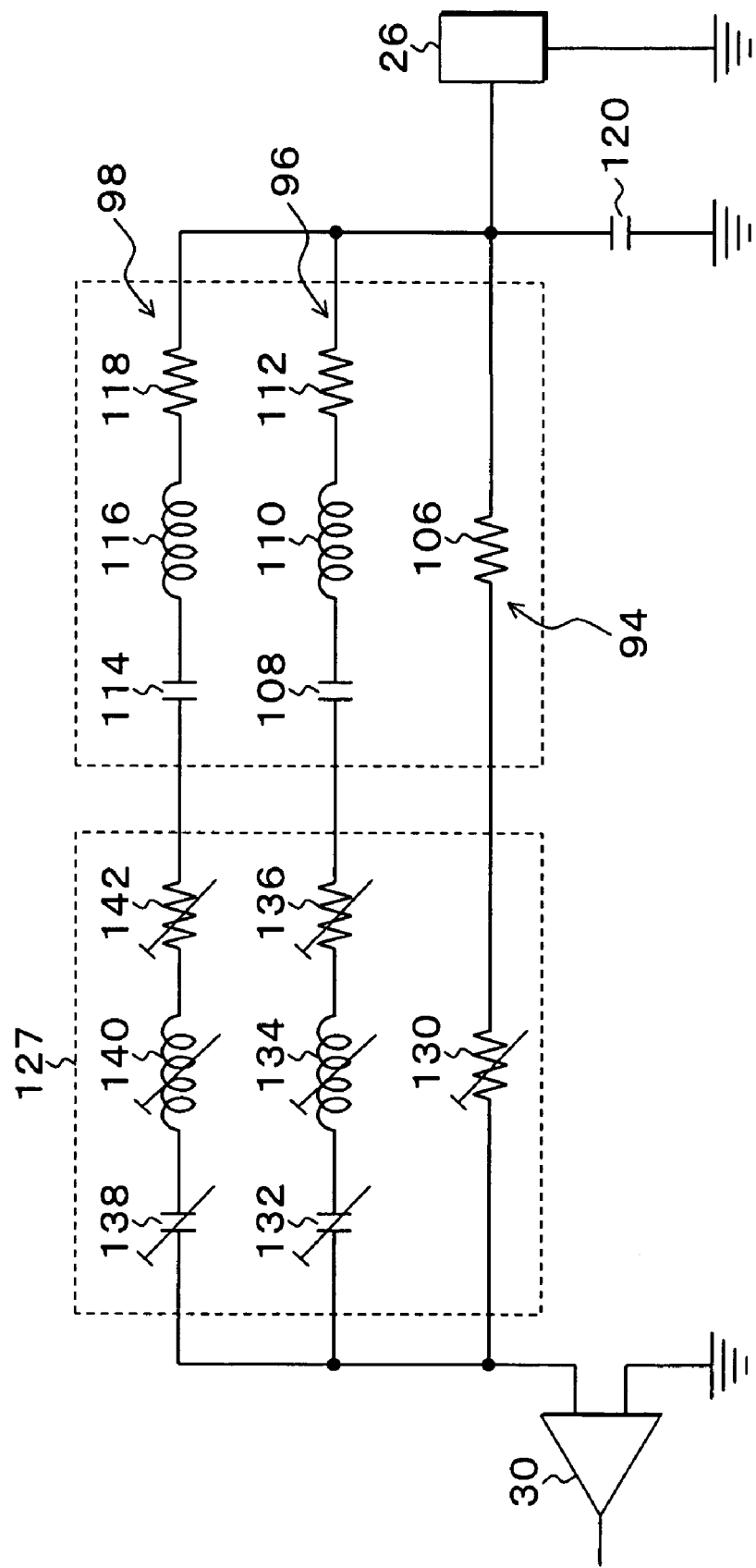
FIG. 13 is an explanatory diagram of transmission path models corresponding to the broadband transmission path apparatus of FIG. 12.

FIG. 13 is an explanatory diagram of a transmission path model corresponding to the broadband transmission path apparatus of FIG. 12, where an adjusting component by the resonant adjusting circuit 127 is provided at the reception terminal as the input stage of the read amplifier 30 for the transmission path model shown in FIG. 10. That is, the resonant adjusting circuit 127 is provided with an adjusting resistor component 130 for the low band transmission path 94, and an adjusting capacitor component 132, an adjusting inductance component 134 and an adjusting resistor component 136 for the first high band transmission path 96. Further, an adjusting capacitor component 138, an adjusting inductance component 140 and an adjusting resistor component 142 are provided for the second high band transmission path 98. This is similar also to the transmission path at the write head 28 side in FIG. 12. The above embodiments exemplify the long tail suspension as the transmission path structure to which the broadband transmission path apparatus according to the present invention is applied, but the present invention can be similarly applied also to a transmission path using a short tail suspension or flexible printed circuit board (FPC) Furthermore, the present invention includes appropriate modifications without losing objects and advantages thereof, and further is not limited by the numerical values indicated in the above embodiments.

What is claimed is:

1. A broadband transmission path apparatus for connecting an amplifier circuit for amplifying signals and a head for writing and reading, wherein either one of the amplifier circuit and the head is assumed as a transmission terminal and the other is assumed as a reception terminal so that the transmission terminal and the reception terminal during writing are connected through a plurality of first transmission paths having different transmission frequency band characteristics and during reading are connected through a plurality of second transmission paths having different transmission frequency band characteristics.

2. The broadband transmission path apparatus according to claim 1, wherein a transmission path for low frequency transmission band and a transmission path for high frequency transmission band are provided and each of the transmission paths is connected by the transmission terminal and the reception terminal.

3. The broadband transmission path apparatus according to claim 2, wherein the transmission path for high frequency transmission band forms a resonant circuit by a resistor component, an inductance component and a capacitor component of the transmission path itself, and realizes the high frequency transmission band characteristic by a resonant frequency characteristic of the resonant circuit.

4. The broadband transmission path apparatus according to claim 2, wherein a resonant circuit sets a resonant frequency within a transmission band by an inductance component and a capacitor component and reduces a Q value by a resistor component to flatten a resonant peak characteristic.

5. The broadband transmission path apparatus according to claim 2, wherein the head circuit is provided with a resonant adjusting circuit for setting and adjusting lack of a resistor component, an inductance component and a capacitor component of the transmission path itself.

6. The broadband transmission path apparatus according to claim 2, wherein a resonant adjusting circuit is provided for each of the transmission paths.

7. A suspension assembly for mounting a head for writing and reading, wherein a broadband transmission path apparatus for connecting a head circuit for amplifying signals and the head are mounted, and
either one of the head circuit and the head is assumed as a transmission terminal and the other is assumed as a reception terminal so that the broadband transmission path apparatus connects the transmission terminal and the reception terminal during writing through a plurality of first transmission paths having different transmission frequency band characteristics and during reading are connected through a plurality of second transmission paths having different transmission frequency band characteristics.

8. The suspension assembly according to claim 7, wherein a transmission path for low frequency transmission band and a transmission path for high frequency transmission band are provided, and each of the transmission paths is connected by the transmission terminal and the reception terminal.

9. The suspension assembly according to claim 8, wherein the transmission path for high frequency transmission band forms a resonant circuit by a resistor component, an inductance component and a capacitor component of the transmission path itself and realizes the high frequency transmission band characteristic by a resonant frequency characteristic of the resonant circuit.

10. The suspension assembly according to claim 8, wherein the resonant circuit sets a resonant frequency within a transmission band by the inductance component and the capacitor component and reduces a Q value by the resistor component to flatten a resonant peak characteristic.

11. The suspension assembly according to claim 7, wherein an output terminal of a read head provided in the head is assumed as a transmission terminal and an input terminal of a read amplifier provided in the head circuit is assumed as a reception terminal so that the transmission terminal and the reception terminal are connected through a plurality of transmission paths.

12. The suspension assembly according to claim 7, wherein an output terminal of a write driver provided in the head circuit is assumed as a transmission terminal and an input terminal of a write head provided in the head is assumed as a reception terminal so that the transmission terminal and the reception terminal are connected through a plurality of transmission paths.

13. The suspension assembly according to claim 7, wherein the transmission path is constituted of an insulator provided on a flexible metal foil constituting a ground and a circuit layer provided on the insulator.

14. A storage medium apparatus comprising:
a head for reading or writing information from/into a storage medium;

a head circuit arranged between the head and a signal processing circuit, which amplifies a signal from said head; and a broadband transmission path apparatus for connecting the head circuit and the head, wherein either one of the head circuit and the head is assumed as a transmission terminal and the other is assumed as a reception terminal so that the broadband transmission path apparatus connects the transmission terminal and the reception terminal during writing through a first plurality of transmission paths having different transmission frequency band characteristics and during reading through a second plurality of transmission paths having a different frequency band characteristics.

15. The storage medium apparatus according to claim 14, wherein a transmission path for low frequency transmission band and a transmission path for high frequency transmission band are provided and each of the transmission paths is connected by the transmission terminal and the reception terminal.

16. The storage medium apparatus according to claim 15, wherein the transmission path for high frequency transmission band forms a resonant circuit by a resistor component, an inductance component and a capacitor component of the transmission path itself, and realizes the high frequency transmission band characteristic by a resonant frequency characteristic of the resonant circuit.

17. The storage medium apparatus according to claim 15, wherein a resonant circuit sets a resonant frequency within a transmission band by an inductance component and the capacitor component and reduces a Q value by the resistor component to flatten a resonant peak characteristic.

18. The storage medium apparatus according to claim 14, wherein an output terminal of a read head provided in the head is assumed as a transmission terminal and an input terminal of a read amplifier provided in the head circuit is assumed as a reception terminal so that the transmission terminal and the reception terminal are connected through a plurality of transmission paths.

19. The storage medium apparatus according to claim 14. wherein an output terminal of a write driver provided in the head circuit is assumed as a transmission terminal and an input terminal of a write head provided in the head is assumed as a reception tenninal so that the transmission terminal and the reception terminal are connected through a plurality of transmission paths.

20. A storage medium apparatus comprising:

a head for reading or writing information from/into a recording medium;

a head circuit for amplifying a signal from the head; and a transmission path apparatus for connecting the head circuit and the head, and assuming either one of the head circuit and the head as a transmission terminal and the other as a reception terminal, and connecting said transmission terminal and said reception terminal during writing through a plurality of first transmission paths having different transmission frequency band characteristics and during reading through a plurality of second transmission paths having different transmission frequency band characteristics, and having transmission frequency band characteristic of no less than 1 GHz between the transmission terminal and the reception terminal.

* * * * *